United States Patent Office 3,360,432
Patented Dec. 26, 1967

3,360,432
CHLOROPHENYLCYCLOPROPANECAR-
BOXAMIDE MITE OVICIDES
Peter E. Newallis, Morris Plains, and Francis A. Spano, Millington, N.J., assignors to Allied Chemical Corporation, New York, N.Y., a corporation of New York
No Drawing. Filed Nov. 12, 1965, Ser. No. 507,526
3 Claims. (Cl. 167—30)

This invention is directed to certain chlorophenylcyclopropanecarboxamides useful as mite ovicides. More particularly, this invention involves use of N-(p-chlorophenyl)cyclopropanecarboxamide and N-(2,4-dichlorophenyl)cyclopropanecarboxamide as mite ovicides.

The above compounds may be represented by the following general formula:

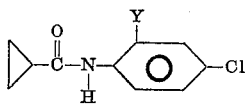

where Y=H or Cl.

These compounds may be prepared by reacting cyclopropanecarboxylic acid chloride with certain chloroanilines. The reaction occurring may be illustrated by the following equation:

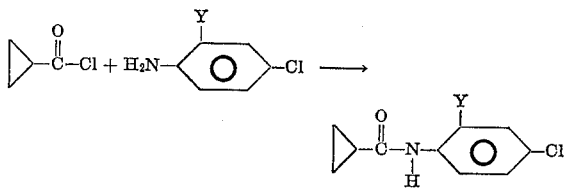

where Y=H or Cl.

The following examples illustrate synthesis of the subject compounds, parts being by weight.

Example I

To a solution of 15 parts of benzene, 8 parts of pyridine and 12.8 parts of p-chloroaniline was added dropwise, with stirring, a solution of 10.5 parts of cyclopropanecarboxylic acid chloride in 7.8 parts of benzene. The reaction mixture was stirred for 1 hour after addition of the acid chloride was completed. The reaction mixture was washed with water and the benzene portion evaporated to dryness. The residue was recrystalized from 50% ethyl alcohol and yielded white plates of N-(p-chlorophenyl)-cyclopropanecarboxamide having a melting point of 163–4° C.

Carbon and hydrogen analysis of the above carboxamide showed 61.16% and 5.31%, respectively, as compared with calculated theoretical values of 61.22% and 5.10%, respectively.

Example II

To a solution of 15 parts of benzene, 8 parts of pyridine and 12.5 parts of 2,4-dichloroaniline was added dropwise, with stirring, a solution of 10.5 parts of cyclopropanecarboxylic acid chloride in 7.8 parts of benzene. The reaction mixture was stirred for 1 hour after the addition of the acid chloride was completed. The reaction mixture was then washed with water and the benzene portion evaporated to dryness. The residue was recrystallized from 50% ethyl alcohol and yielded white needles of N - (2,4 - dichlorophenyl)cyclopropanecarboxamide, a novel compound, having a melting point of 158–9° C.

Carbon and hydrogen analysis of the above carboxamide showed 52.35% and 4.04%, respectively, as compared with calculated theoretical values of 52.17% and 3.91%.

As indicated above, these compounds find valuable application as mite ovicides when sprayed on or otherwise applied to infested plants.

Liquid miticide sprays containing the toxicant may be prepared by first forming a solution of the compound in a suitable organic solvent, e.g., acetone. A small amount of an emulsifying agent commonly employed in the art, such as an alkyl aryl polyethoxy alcohol or a polyethylene glycol fatty ester, can be added. The concentrate solution thus formed is incorporated with water in an amount sufficient to form an aqueous spray dispersion or emulsion having the desired active ingredient concentration.

The miticides of this invention may also be applied as aqueous spray dispersions or suspensions which are formed by incorporating in water so-called dry wettable spray powders, for example, a powder composed of 98% attapulgite clay as an extender, 1% polyvinyl alcohol as a dispersant, and 1% alkyl aryl sulfonate as a wetting agent. Examples of other extenders which can be used are diatomaceous earth and synthetic mineral fillers derived from silica and silicates. Examples of other wetting agents which can be used are alkyl benzene and alkyl naphthalene sulfonates and sulfated fatty-alcohols, -amines, or -acid amides. Other useable dispersants are methyl cellulose and polymethylene bis naphthalene sulfonate.

Spray compositions of this invention normally contain toxicant in an amount not less than 8 oz. per 100 gallons of composition, the more usual amount being about 1 lb. per 100 gallons of composition.

The table below shows test results on plants infested with mite eggs of spray compositions of various dosages of N-(p-chlorophenyl)cyclopropanecarboxamide diluted with equal volumes of acetone and water. There was no evidence of phytotoxicity.

| Amount of N-(p-chlorophenyl)cyclopropanecarboxamide per 100 gals. of composition | Ovicidal activity after 7 days on two-spotted spider mites |
|---|---|
| 1 lb. | No mite eggs hatched. |
| 8 oz. | No mite eggs hatched. |
| 4 oz. | Very few mite eggs hatched. |
| [1] | Normal hatch. |

[1] Check.

The test was conducted by infesting young potted horticultural (cranberry) bean plants with adult mites one day before treatment. The plants were treated by spraying with the toxicant composition and were then placed in irrigated trays in the greenhouse. Ovicidal observations of the eggs laid on the plants were made 7 days after treatment, which allows ample time for eggs to hatch under greenhouse conditions.

In a further test, N-(2,4-dichlorophenyl)cyclopropanecarboxamide was used as the toxicant in a formulation consisting of:

| | Oz. |
|---|---|
| Toxicant | 4.00 |
| Attapulgite clay—solid extender | 11.76 |
| Polyvinyl alcohol—dispersant | 0.12 |
| Alkyl aryl sulfonate—wetting agent | 0.12 |

The formulation was diluted with 100 gallons of water. This test was conducted in the same manner as the previous test except that here the adult mites were removed just prior to spraying. Observation made 7 days after spraying showed that N-(2,4-dichlorophenyl)cyclopropanecarboxamide also controlled hatching of the mite eggs.

Compounds which are position isomers of the subject compounds, i.e. N-(o-chlorophenyl)cyclopropanecarboxamide, N - (m-chlorophenyl)cyclopropanecarboxamide, and N-(3,4-dichlorophenyl)cyclopropanecarboxamide, were also tested as mite ovicides, in the same manner as the first test described above. The isomers tested were employed as spray compositions containing 2 lbs. of isomer per 100 gals. of solvent composed of equal volumes of acetone and water. Even at this dosage (double the usual dosage for the subject compounds) the isomers failed to prevent substantially normal hatch of the mite eggs.

The above disclosure is for purposes of description only and other embodiments and modifications will be apparent to those skilled in the art. Therefore this invention should be construed as limited only by the scope of the following claims.

We claim:
1. The process of combatting mites which comprises exposing mite eggs to a toxic ingredient selected from the group consisting of N-(p-chlorophenyl)cyclopropanecarboxamide and N-(2,4-dichlorophenyl)cyclopropanecarboxamide.

2. The process of claim 1 wherein the toxic ingredient is N-(p-chlorophenyl)cyclopropanecarboxamide.

3. The process of claim 1 wherein the toxic ingredient is N-(2,4-dichlorophenyl)cyclopropanecarboxamide.

References Cited

UNITED STATES PATENTS

| | | | |
|---|---|---|---|
| 3,201,466 | 8/1965 | Dubrovin | 260—557 |
| 3,211,544 | 10/1965 | Dubrovin | 71—118 |
| 3,277,107 | 10/1966 | Neighbors | 260—557 XR |
| 3,277,171 | 10/1966 | Hopkins | 260—557 |
| 3,294,833 | 12/1966 | Phillips | 260—557 XR |
| 3,306,727 | 2/1967 | Neighbors | 71—118 |

OTHER REFERENCES

Hopkins et al.: J. Agr. & Food Chem. 15(3) 501–507, May-June 1967.

LEWIS GOTTS, *Primary Examiner.*

S. K. ROSE, *Assistant Examiner.*